(12) United States Patent
Beeck et al.

(10) Patent No.: US 11,174,753 B2
(45) Date of Patent: Nov. 16, 2021

(54) GUIDE VANE FOR A TURBOMACHINE

(71) Applicant: Siemens Aktiengesellschaft, Munich (DE)

(72) Inventors: Alexander Ralph Beeck, Orlando, FL (US); Hans-Thomas Bolms, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 17 days.

(21) Appl. No.: 16/483,427

(22) PCT Filed: Feb. 6, 2018

(86) PCT No.: PCT/EP2018/052879
§ 371 (c)(1),
(2) Date: Aug. 4, 2019

(87) PCT Pub. No.: WO2018/146062
PCT Pub. Date: Aug. 16, 2018

(65) Prior Publication Data
US 2020/0011200 A1  Jan. 9, 2020

(30) Foreign Application Priority Data

Feb. 10, 2017 (EP) .................................... 17155609

(51) Int. Cl.
*F01D 11/00* (2006.01)
*F01D 25/12* (2006.01)

(52) U.S. Cl.
CPC ............ *F01D 25/12* (2013.01); *F01D 11/001* (2013.01); *F05D 2230/21* (2013.01);
(Continued)

(58) Field of Classification Search
CPC ...... F01D 5/081; F01D 11/001; F01D 11/025; F01D 11/04; F01D 25/12; F02C 7/18;
(Continued)

(56) References Cited

U.S. PATENT DOCUMENTS

| 8,277,177 B2 * | 10/2012 | Liang ........................ F02C 7/12 |
| | | 415/173.1 |
| 10,697,313 B2 * | 6/2020 | Correia .................... F01D 25/12 |

(Continued)

FOREIGN PATENT DOCUMENTS

| CN | 105074132 A | 11/2015 |
| DE | 102006004437 A1 | 11/2006 |

(Continued)

OTHER PUBLICATIONS

PCT International Search Report and Written Opinion of International Searching Authority dated Apr. 6, 2018 corresponding to PCT International Application No. PCT/EP2018/052879 filed Jun. 2, 2018.

*Primary Examiner* — Woody A Lee, Jr.
*Assistant Examiner* — Danielle M. Christensen

(57) ABSTRACT

A guide vane for a turbomachine, having a blade airfoil and at least one platform, to which the blade airfoil is connected. A cooling channel system is provided for cooling the platform and the blade airfoil. The platform has, on the side thereof facing the airfoil, at least one sealing lip for sealing to a rotating system of the turbomachine. At least one cooling channel extends through the sealing lip, which cooling channel forms part of the cooling channel system.

15 Claims, 5 Drawing Sheets

(52) U.S. Cl.
CPC .. *F05D 2230/232* (2013.01); *F05D 2230/237* (2013.01); *F05D 2230/238* (2013.01); *F05D 2240/12* (2013.01); *F05D 2240/127* (2013.01); *F05D 2300/175* (2013.01)

(58) Field of Classification Search
CPC .... F02C 7/28; F05D 2240/81; F05D 2240/12; F05D 2240/126; F16J 15/447
See application file for complete search history.

(56) References Cited

U.S. PATENT DOCUMENTS

| | | |
|---|---|---|
| 2006/0269409 A1 | 11/2006 | Torii et al. |
| 2008/0175716 A1 | 7/2008 | Potier |
| 2012/0121415 A1 | 5/2012 | Brittingham et al. |
| 2014/0193243 A1* | 7/2014 | Nallam .................. F01D 11/02 415/170.1 |
| 2014/0219780 A1 | 8/2014 | Lacy et al. |
| 2014/0356172 A1* | 12/2014 | Sicard .................. F01D 5/3007 416/193 A |
| 2016/0017714 A1 | 1/2016 | Szijarto et al. |
| 2016/0017720 A1* | 1/2016 | Lewis .................. F01D 5/187 416/1 |
| 2016/0186664 A1* | 6/2016 | Kirtley .................. F02C 7/18 415/115 |
| 2016/0201472 A1* | 7/2016 | Okajima ............... F01D 25/246 415/177 |
| 2016/0258320 A1* | 9/2016 | Thomas .................. F01D 5/189 |

FOREIGN PATENT DOCUMENTS

| | | |
|---|---|---|
| DE | 102011055375 A1 | 5/2012 |
| DE | 102014101360 A1 | 8/2014 |
| EP | 1167695 A1 | 1/2002 |
| EP | 1211384 A2 | 6/2002 |
| JP | 2008095695 A | 4/2008 |
| JP | 2016125496 A | 7/2016 |

* cited by examiner

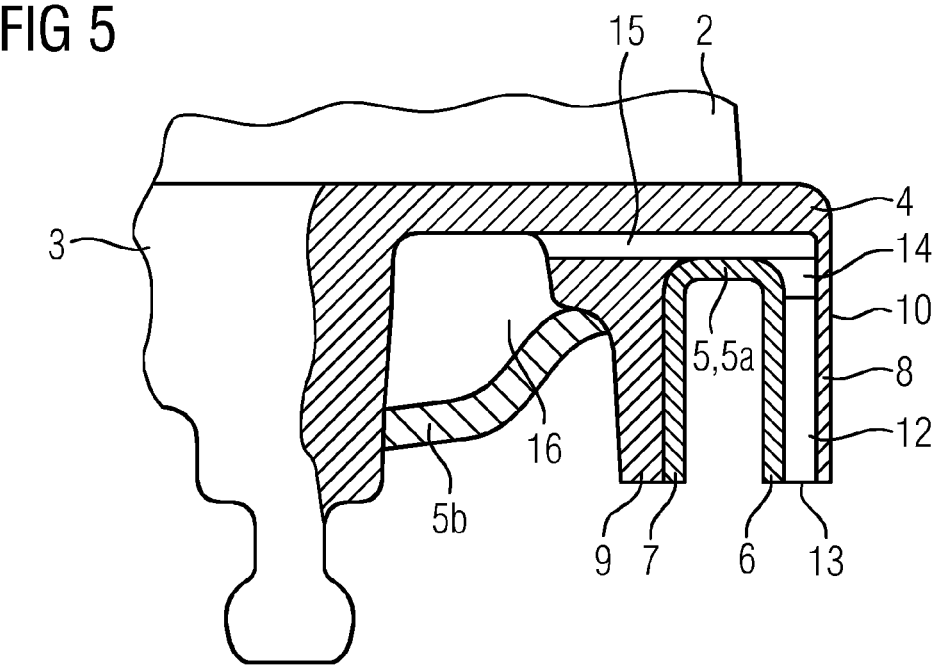
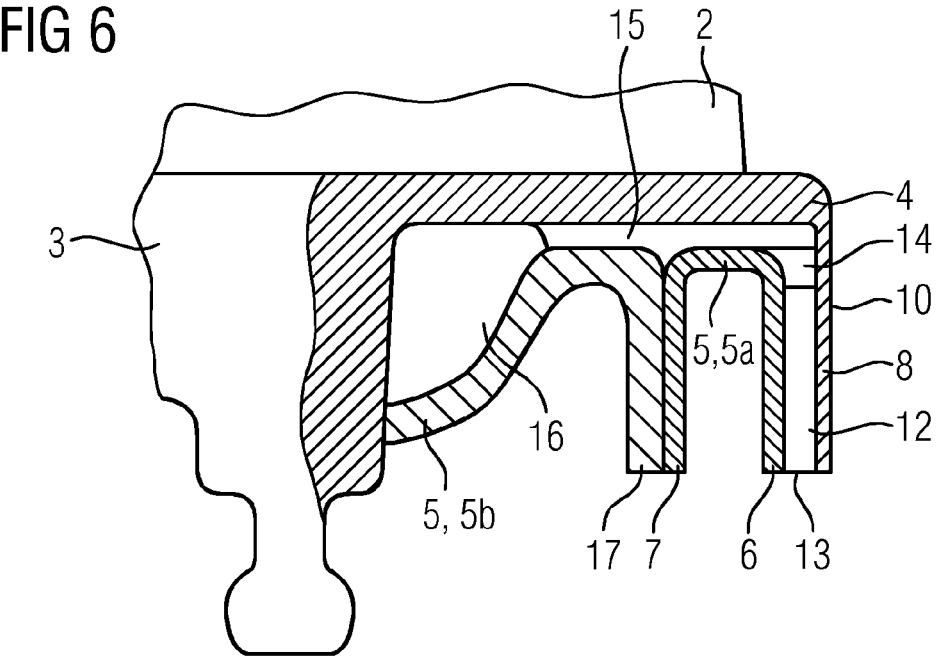

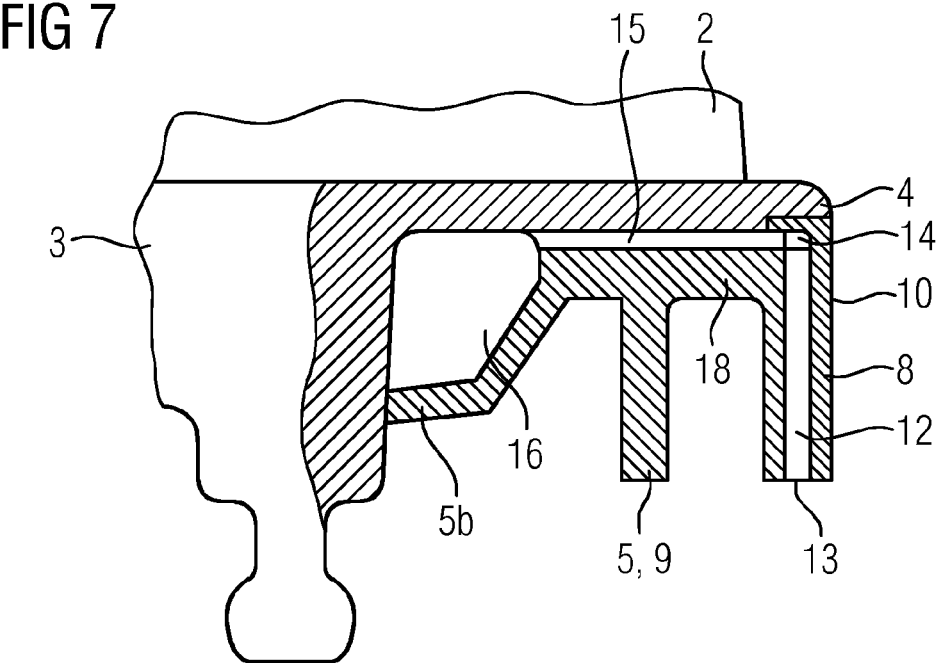
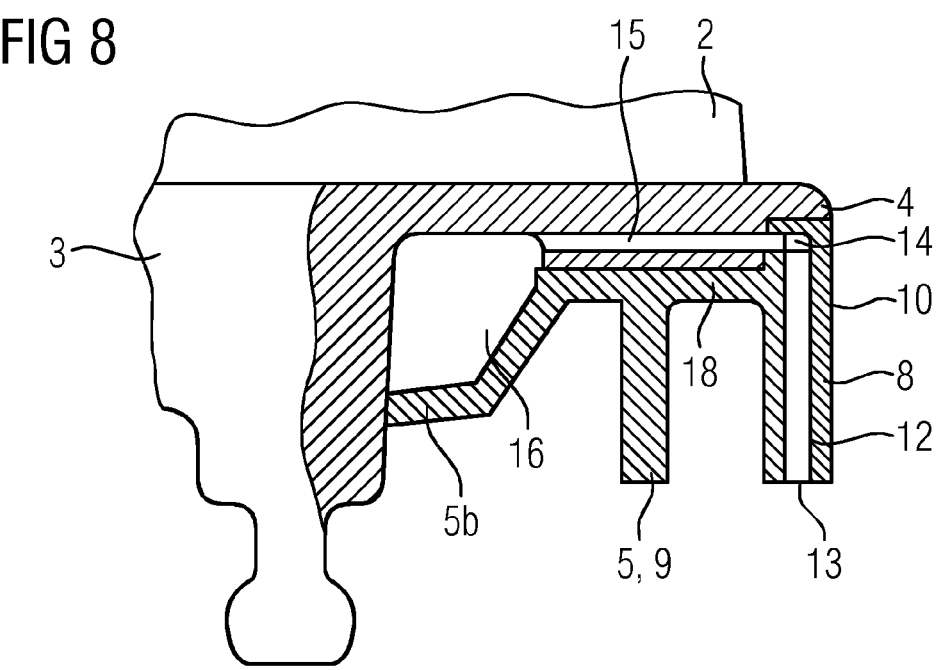

GUIDE VANE FOR A TURBOMACHINE

CROSS REFERENCE TO RELATED APPLICATIONS

This application is the US National Stage of International Application No. PCT/EP2018/052879 filed Feb. 6, 2018, and claims the benefit thereof. The International Application claims the benefit of European Application No. EP17155609 filed Feb. 10, 2017. All of the applications are incorporated by reference herein in their entirety.

FIELD OF INVENTION

The present invention relates to a guide vane for a turbomachine, having a vane blade and at least one platform to which the vane blade is connected, wherein a cooling duct system for cooling the platform and the vane blade is provided, and wherein the platform, for sealing in relation to a rotating system of the turbomachine, on the side thereof that faces away from the blade comprises at least one seal lip that projects from the platform.

BACKGROUND OF INVENTION

Turbine blades are used in turbomachines such as gas turbines, for instance. In principle, a differentiation is made between rotating rotor blades and stationary guide vanes, which direct a hot fluid operating medium, in particular gas, in the direction of the rotor blades. The turbine blades during the operation thereof are exposed to high thermal stresses in particular on account of the high temperature of the fluid operating medium and, associated therewith, the high thermal input from the fluid operating medium into the turbine blades. Damage to the turbine blades can result on account thereof.

In order for the high thermal stresses of turbine blades to be counteracted, turbine blades are often produced from metal alloys that are resistant to high temperatures, on the one hand. On the other hand, turbine blades are typically actively cooled by a cooling fluid by way of a cooling duct system. It is thus known, for example, from DE 10 2011 055 375 A1 and from EP 1 167 695 A1, for platform protrusions that project in a downward manner to be designed so as to be hollow and thus capable of being cooled. Combined impact cooling and film cooling of the platform can be used herein. Moreover, EP 1 211 384 A2 discloses a method for incorporating coil-shaped cooling ducts in the transition region of a turbine blade by means of a helical erosion electrode.

SUMMARY OF INVENTION

Against this background, the present invention is based on an object of providing a guide vane of the type mentioned at the outset having an efficient cooling duct system.

In order for this object to be achieved, the present invention provides a guide vane of the type mentioned at the outset which is characterized in that at least one cooling duct which forms part of the cooling duct system extends through the seal lip. In this way, the seal lip can also be actively cooled on account of which efficient and uniform cooling of the entire platform results. Large temperature variations within the material which can lead to thermal stresses and damage to the guide vane are thus avoided.

Furthermore, a plurality of cooling ducts are provided, the exit openings of said cooling ducts being disposed in the free end of the seal lip. The cooling ducts, in each case proceeding from a free end of the seal lip, extend through the seal lip in at least a substantially radial direction and thus parallel to the terminating face and in particular so as to be at least substantially mutually parallel. Particularly efficient and uniform cooling of the seal lip is achieved on account of a plurality of cooling ducts which extend in the afore-described manner. Moreover, during the intended use of the guide vane improved sealing of the gap between the seal lip and the rotating system results on account of cooling air exiting from the cooling ducts at the free end of the seal lip that points in a radially inward manner. At least one connecting duct is advantageously provided so as to be spaced apart from the free end of the seal lip, said connecting duct connecting the plurality of cooling ducts to one another and likewise forming part of the cooling duct system. The cooling fluid can be supplied centrally to the cooling ducts on account of the connecting duct which advantageously extends in the circumferential direction.

According to one design embodiment of the invention, the at least one seal lip is disposed in a peripheral region of the platform that is forward or rearward in the axial flow direction, and from the side of the platform that faces away from the blade projects in at least a substantially radial manner such that said seal lip defines a terminating face of the platform.

The platform is advantageously assembled from a platform base part and at least one platform attachment part that is connected, advantageously welded or soldered/brazed, to said platform base part, wherein the at least one cooling duct and advantageously further parts of the cooling duct system is/are at least in part defined by the at least one platform attachment part. Small cooling ducts can be configured on account of the configuration of the platform in multiple parts, in particular two parts, and in particular narrow seal lips can thus be effectively cooled. Moreover, the casting and the machining of the platform are significantly simplified on account of the configuration in multiple parts.

At least one groove, in particular a groove produced by casting technology, which in order for the at least one cooling duct to be defined is covered by a platform attachment part in the form of a plate, in particular a metal plate, is advantageously provided in the platform base part. It is thus possible to configure a plurality of cooling ducts in only a few operating steps.

The platform on the side thereof that faces away from the blade can comprise two directly adjacent seal lips which extend so as to be in particular at least substantially mutually parallel and spaced apart.

The platform attachment part is expediently provided in the form of a U-shaped profile plate which is disposed between the two seal lips in such a manner that the opposite legs of said U-shaped profile plate bear in a planar manner on the seal lips and cover the at least one groove.

Alternatively, the platform attachment part can be provided in the form of a U-shaped profile plate, the first leg thereof bearing in a planar manner on a first of the two seal lips in order for the at least one groove provided therein to be covered, and the second leg thereof being connected, in particular welded or soldered/brazed, to a leg of a further platform attachment part in the form of a termination plate in order for the second of the two seal lips to be defined by the two connected legs.

Additionally or alternatively to a soldered/brazed or welded connection, it is also possible for the U-shaped profile plate to be jammed and thus be held in a force-fitting manner between the two seal lips or between the seal lip and the leg of the termination plate. When the platform is heated during the operation, the raw material of the profile plate expands more rapidly than the raw material of the platform, this further strengthening the force-fitting connection.

According to one further alternative, the platform attachment part can be provided in the form of an integral profile plate having a U-shaped portion, the first leg thereof bearing in a planar manner on a first of the two seal lips in order for the at least one groove provided therein to be covered, and the second leg thereof defining the second of the two seal lips, and a termination plate portion that adjoins said integral profile plate. On account of the integral configuration of the profile plate, the operating step of connecting a platform attachment part in the form of a U-shaped profile plate to a platform attachment part in the form of a termination plate by means of soldering/brazing or welding is dispensed with.

Alternatively to the at least one groove in the platform base part, which in order for the at least one cooling duct to be defined is covered by a platform attachment part in the form of a plate, the platform attachment part can be produced in an additive manner, advantageously by means of selective laser melting—SLM, and completely defines at least the at least one cooling duct. The platform attachment part including the at least one cooling duct configured therein is thus produced integrally in one operative step.

On account of the additive production, the platform attachment part can have cooling ducts of the most diverse shapes. For example, the platform attachment part can have very fine and/or microstructure-type cooling ducts which enable an extremely efficient utilization of the cooling fluid, in particular cooling air. On account of the additive production, at least one turbulence element can likewise be incorporated in the at least one cooling duct. A turbulence element enables the heat transfer to be precisely adapted to the respective stress of the platform.

The platform attachment part produced in an additive manner expediently defines a complete seal lip having the at least one cooling duct. The platform attachment part produced in an additive manner can also define two seal lips that are connected by way of a brace and a termination plate that is connected to the seal lips.

Additionally to the plurality of cooling ducts, the platform attachment part advantageously at least in part also defines the afore-described connecting duct that connects the plurality of cooling ducts, or further parts of the cooling duct system.

The platform base part and/or the at least one platform attachment part can be produced from a super alloy, advantageously a nickel-based super alloy. The platform base part and the at least one platform attachment part are advantageously produced from the same material, in particular from a super alloy, advantageously a nickel-based super alloy. The advantage of a nickel-based super alloy is that said nickel-based super alloy has a sufficient resistance to temperature as well as a stability in terms of oxidation and temperature.

Alternatively to the afore-described configuration of the platform in multiple parts, the at least one cooling duct in the case of an integral configuration of the platform can in principle also be configured as a bore, in particular as a bore incorporated by means of an erosion procedure.

BRIEF DESCRIPTION OF THE DRAWINGS

Further features and advantages of the present invention will become evident by means of the description hereunder of four embodiments of a guide vane for a turbomachine according to the present invention, with reference to the appended drawing. In the drawing:

FIG. 5 shows a schematic lateral view of part of the platform of the guide vane illustrated in FIG. 1, in a partially sectional view;

FIG. 6 shows a schematic lateral view of part of the platform of a guide vane according to a second embodiment of the present invention, in a partially sectional view;

FIG. 7 shows a schematic lateral view of part of the platform of a guide vane according to a third embodiment of the present invention, in a partially sectional view; and FIG. 8 shows a schematic lateral view of part of the platform of a guide vane according to a fourth embodiment of the present invention, in a partially sectional view.

DETAILED DESCRIPTION OF INVENTION

Figure 1:
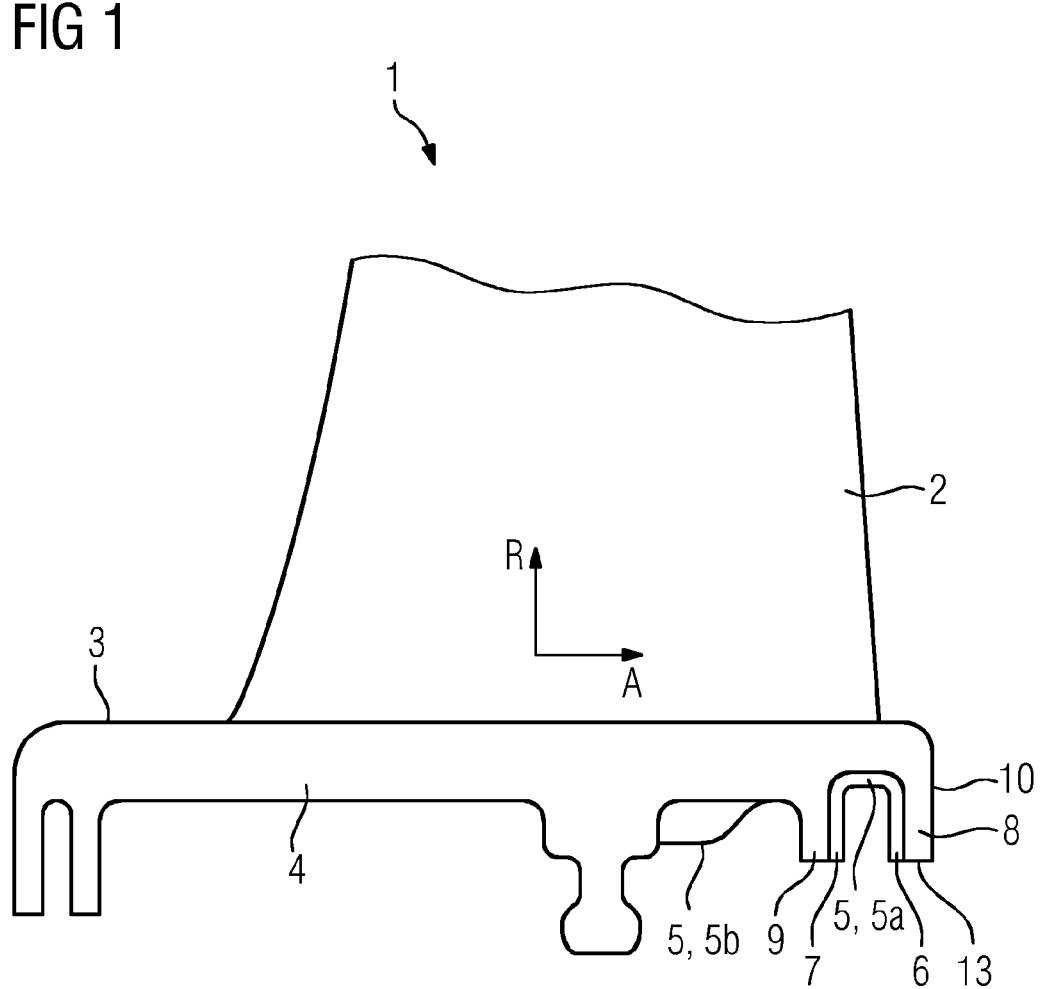
FIG. 1 shows a schematic lateral view of a guide vane according to a first embodiment of the present invention.
Figure 2:
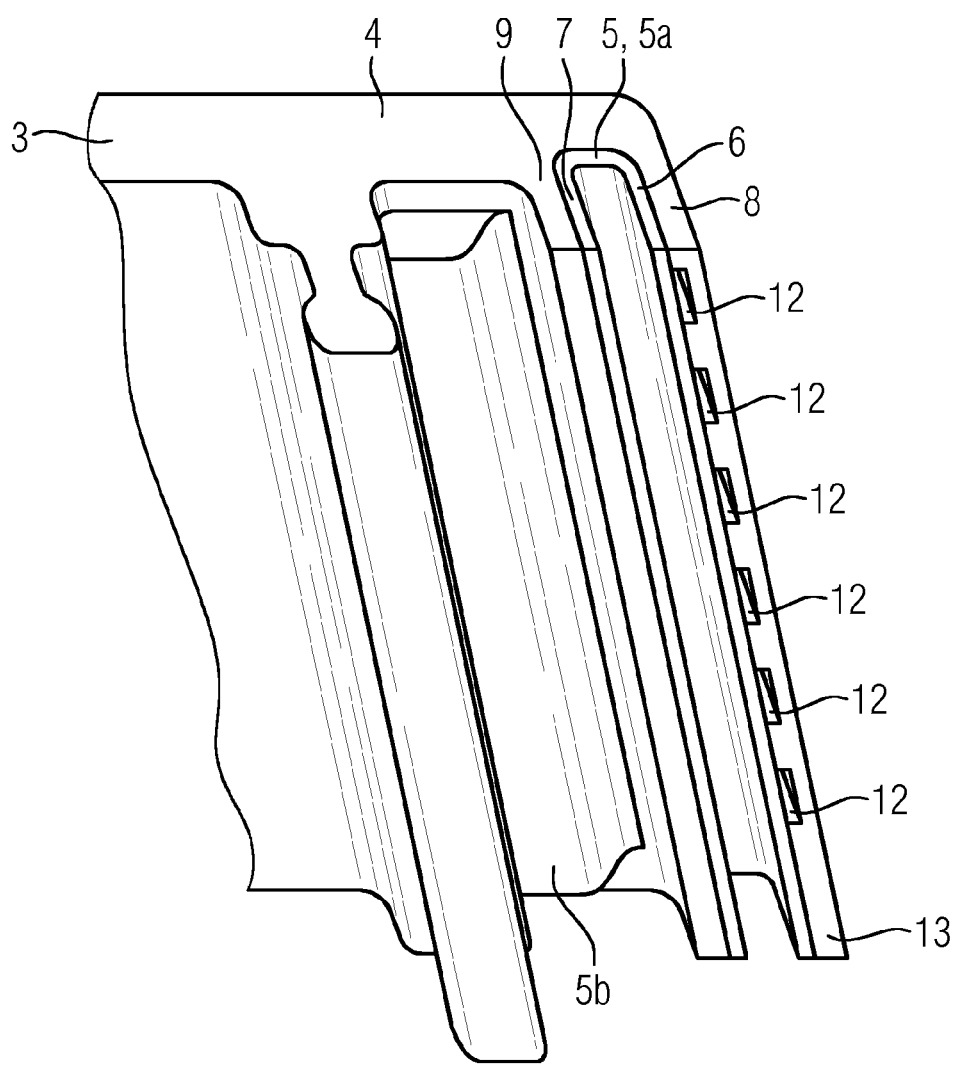
FIG. 2 shows a schematic view of part of the platform of the guide vane illustrated in FIG. 1, seen from obliquely below.
Figure 3:
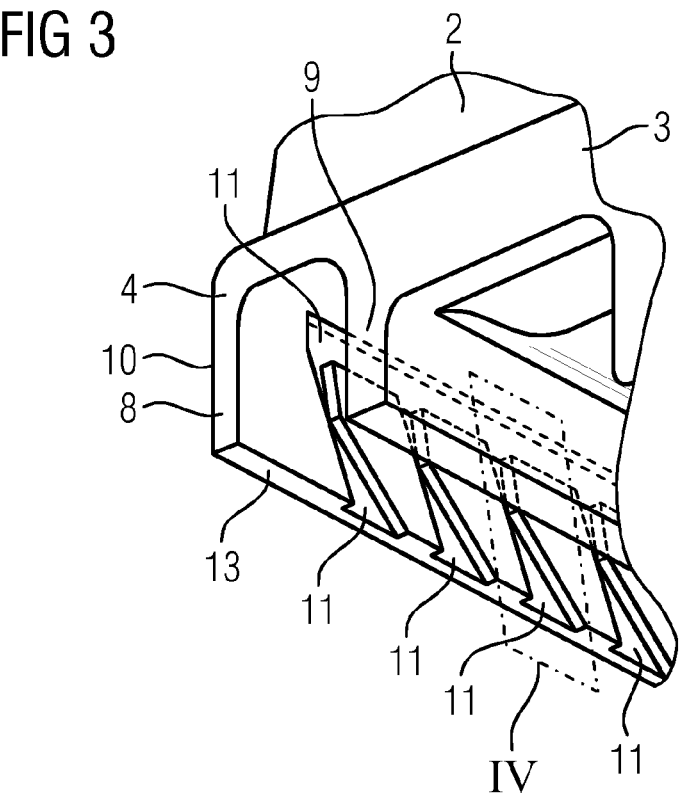
FIG. 3 shows a schematic view of part of the platform of the guide vane illustrated in FIG. 1, having visible cooling and connecting ducts, seen from obliquely below.
Figure 4:
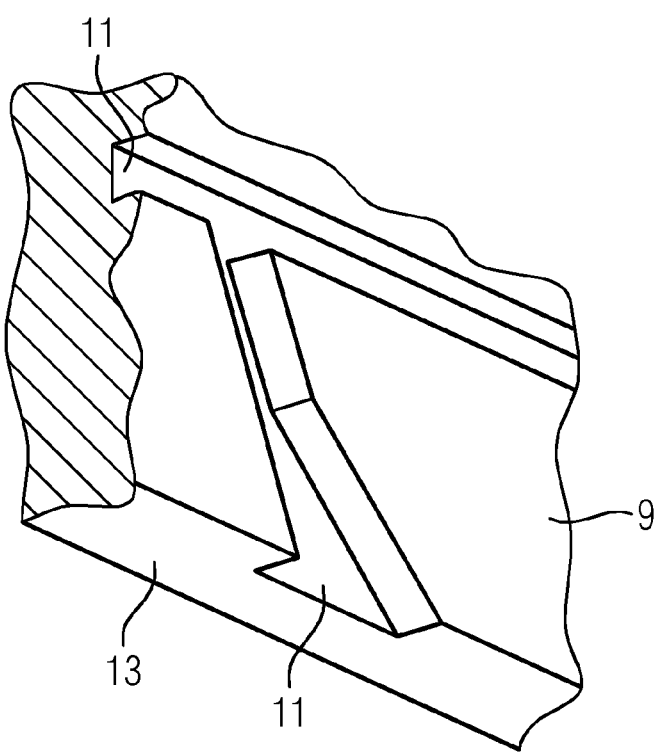
FIG. 4 shows a schematic enlarged view of the region of the platform marked by B in FIG. 3.

FIGS. 1 to 5 show schematic views of a guide vane 1 for a turbomachine according to a first embodiment of the present invention. The guide vane 1 herein comprises a vane blade 2 and a platform 3 to which the vane blade 2 is connected. The platform 3 is assembled from a platform base part 4 and platform attachment parts 5 in the form of a U-shaped metal profile plate 5a having two opposite legs 6, 7, and in the form of a termination plate 5b, said plates being connected to the platform base part 4 by means of welding. The platform base part 4, for sealing in relation to a rotating system of the turbomachine, at the peripheral region thereof that is rearward in the axial flow direction A comprises two directly adjacent seal lips 8, 9 that extend so as to be mutually parallel and spaced apart and radially project from that side of the platform 3 that faces away from the blade. The seal lips 8, 9 are thus radially inward pointing sealing partners of the seal assembly which as communicating sealing partners comprises a friction face (not illustrated) or a seal lip of a likewise design that however points outward. The communicating sealing partner is disposed on the rotor or is part of a rotor blade. The rearmost seal lip 9 in the axial flow direction A defines a terminating face 10 of the platform 3.

Grooves 11 produced by casting technology are provided in the platform base part 4, in particular in the rearmost seal lip 9 in the axial flow direction A. The U-shaped metal profile plate 5a is disposed between the two seal lips 8, 9 in such a manner that the opposite legs 6, 7 of the latter bear in a planar manner on the seal lips 8, 9, on account of which the grooves 11 are covered by the metal profile plate 5a. Accordingly, cooling ducts 12 which form part of a cooling duct system for cooling the guide vane 1 are defined by the platform base part 4 as well as by the metal profile plate 5a. On account of the configuration of the platform 3 in two parts, in particular thin seal lips 8, 9 can be actively cooled in an efficient manner.

In the embodiment described here, six cooling ducts 12 are configured in the seal lip 9, the exit openings of said cooling ducts 12 being disposed in a radially inward pointing free end 13 of the seal lip 9. From there, the cooling ducts 12, in each case proceeding from the rearmost seal lip 9 in the axial flow direction A, extend through the seal lip 9 in a slightly oblique manner in relation to the radial direction R, thus in a substantially radial direction R, and so as to be mutually parallel.

The cooling duct system moreover comprises a connecting duct 14 which extends in the circumferential direction of the platform 3 and is provided so as to be spaced apart from the free end 13 of the seal lip 9, the cooling ducts 12 opening into said connecting duct 14 such that said cooling ducts 12 are connected to one another. The connecting duct 14 that extends approximately in the circumferential direction of the platform 3 is connected to a collection duct 16 by way of a plurality of connecting ducts 15 that extend in the axial flow direction A. The collection duct 16 is at least in part defined by a further platform attachment part 5 in the form of a termination plate 5b which is connected to the platform base part 4 by means of welding. The connecting ducts 15 and the collection duct 16 likewise form part of the cooling duct system.

In that the cooling duct system does not only have ducts within a primary portion of the platform 3 but also in the seal lip 8 an ideally uniform cooling of the platform 3 is achieved, and large temperature variations within the material of the platform 3 are avoided.

In the case of the afore-described embodiment, the platform base part 4 as well as the platform attachment parts 5, or 5a and 5b, respectively, are produced from the same nickel-based super alloy.

In operation, the cooling fluid is supplied to the cooling duct system of the guide vane, said cooling fluid subsequently flowing through the collection duct 16 and the connecting duct 14 and thereafter being able to flow through the cooling ducts 12 in order for the seal lip 8 to be cooled. By virtue of the exit openings disposed in the free end 13, the cooling fluid upon leaving the guide vane finally contributes toward improving the seal assembly between the stator and the rotor.

The second embodiment of a guide vane 1 according to the invention, shown in FIG. 6, corresponds substantially to the first embodiment. The single point of differentiation lies in that the platform base part 4 in the case of the second embodiment at the rear peripheral region thereof in the axial flow direction A comprises only the first seal lip 8 of the two seal lips 8, 9. As is already the case in the first embodiment, the first leg 6 of the U-shaped metal profile plate 5a also in the second embodiment bears in a planar manner on the first seal lip 8 and is connected to the latter by means of welding. However, in the case of the second embodiment, the termination plate 5b also has a leg 17 which by means of welding is connected to the second leg 7 of the U-shaped metal profile plate 5a in order for the second seal lip 9 of the two seal lips 8, 9 to be defined. Grooves 11 which are covered by the U-shaped metal profile plate 5a and the termination plate 5b in order for the six cooling ducts 12 and the connecting ducts 14, 15 to be partially defined are cast in the platform base part 4, in particular the first seal lip 8. Moreover, the termination plate 5b conjointly with the platform base part 4 defines the collection duct 16.

FIG. 7 shows a third embodiment of a guide vane 1 according to the invention, in which the platform 3 is assembled from a platform base part 4 and exactly one platform attachment part 5, which is produced in an additive manner by means of selective laser melting and is connected by means of welding to the platform base part 4. The platform base part 4 in the case of the third embodiment does not comprise any seal lip 8, 9 at all. Instead, the platform attachment part 5 defines two seal lips 8, 9 that are connected by a brace 18, and a termination plate 5b of the platform 3 that is connected to the seal lips 8, 9.

Moreover, the platform attachment part 5 completely defines the cooling ducts 12 within the seal lip 8, said cooling ducts 12 having been mentioned in the context of the two preceding embodiments, as well as the connecting duct 14 that extends in the circumferential direction of the platform 3. The cooling ducts 12 configured by means of an additive production method are very small, this being particularly advantageous when very narrow seal lips are to be actively cooled. Turbulence elements which for the sake of clarity are not shown in FIG. 7 are incorporated in the cooling ducts 12. Said turbulence elements enable the heat transfer to be precisely adapted to the respective stress of the platform 3.

In the case of the third embodiment, the connecting ducts 15, that extend in the axial flow direction A and have likewise already been mentioned in the context of the two preceding embodiments, are cast in the platform base part 4 and, like the collection duct 16, are partially defined by the platform attachment part 5.

As can be seen in FIG. 8, the platform attachment part 5 is welded to the platform base part 4 in such a manner that the ducts 12, 14 of the platform attachment part 5 are fluidically connected to the further ducts 15, 16.

The fourth embodiment of a guide vane 1 according to the invention, shown in FIG. 8, corresponds substantially to the third embodiment. The single point of differentiation lies in that the connecting ducts 15 that extend in the axial flow direction A in the case of the fourth embodiment are bored into the platform base part 4 and are therefore completely defined by the platform base part 4.

While the invention in detail has been illustrated and described in more detail by way of the exemplary embodiments, the invention is not limited by the disclosed examples, and other variations can be derived therefrom by the person skilled in the art without departing from the scope of protection of the invention.

The invention claimed is:

1. A guide vane for a turbomachine, comprising:
a vane blade and a platform to which the vane blade is connected, a cooling duct system for cooling the platform and the vane blade, and at least one seal lip,
wherein the at least one seal lip projects radially inwardly from a side of the platform that faces away from the vane blade for sealing in relation to a rotating system of the turbomachine,
wherein at least one cooling duct which forms part of the cooling duct system extends through the at least one seal lip,
wherein the cooling duct system comprises a plurality of cooling ducts which extend through the at least one seal lip in at least a substantially radial direction, exit openings of said plurality of cooling ducts being disposed in a free end of the at least one seal lip that is a radially inward end of the seal lip facing away from the vane blade, and
wherein the plurality of cooling ducts are circumferentially spaced apart from one another.

2. The guide vane as claimed in claim 1,
wherein the at least one seal lip is disposed in a peripheral region of the platform that is forward or rearward in the axial flow direction, and from the side of the platform that faces away from the vane blade projects in at least a substantially radial manner such that said at least one seal lip defines a terminating face of the platform that extends so as to be largely parallel to the radial direction.

3. The guide vane as claimed in claim 1,
wherein at least one connecting duct which connects the plurality of cooling ducts to one another and forms part of the cooling duct system is provided so as to be spaced apart from the free end of the at least one seal lip.

4. The guide vane as claimed in claim 1,
wherein the platform is assembled from a platform base part and at least one platform attachment part that is connected, welded, or soldered/brazed, to said platform base part, wherein the at least one cooling duct and/or further parts of the cooling duct system is/are at least in part defined by the at least one platform attachment part.

5. The guide vane as claimed in claim 4,
wherein at least one groove, or a groove produced by casting technology, which in order for at least the at least one cooling duct to be defined is covered by a platform attachment part in the form of a plate, or a metal plate, is provided in the platform base part.

6. The guide vane as claimed in claim 5,
wherein the platform attachment part is provided in the form of a U-shaped profile plate which is disposed between the two seal lips in such a manner that the opposite legs of said U-shaped profile plate bear in a planar manner on the two seal lips and cover the at least one groove.

7. The guide vane as claimed in claim 5,
wherein the platform attachment part is provided in the form of a U-shaped profile plate, the first leg thereof bearing in a planar manner on a first of the two seal lips in order for the at least one groove provided therein to be covered, and the second leg thereof being connected, welded, or soldered/brazed, to a leg of a further platform attachment part in the form of a termination plate in order for the second of the two seal lips to be defined by the two connected legs.

8. The guide vane as claimed in claim 5,
wherein the platform attachment part is provided in the form of an integral profile plate having a U-shaped portion, the first leg thereof bearing in a planar manner on a first of the two seal lips in order for the at least one groove provided therein to be covered, and the second leg thereof defining the second of the two seal lips, and a termination plate portion that adjoins said integral profile plate.

9. The guide vane as claimed in claim 4,
wherein the platform attachment part is produced in an additive manner, or by selective laser melting—SLM, and completely defines at least the at least one cooling duct.

10. The guide vane as claimed in claim 9,
wherein the platform attachment part defines two seal lips that are connected by way of a brace and a termination plate that is connected to the two seal lips.

11. The guide vane as claimed in claim 9,
wherein at least one turbulence element is incorporated in the at least one cooling duct.

12. The guide vane as claimed in claim 4,
wherein the platform base part and/or the at least one platform attachment part are/is produced from a super alloy, or a nickel-based super alloy.

13. The guide vane as claimed in claim 4,
wherein the platform base part and the at least one platform attachment part are produced from the same material, or from a super alloy, or a nickel-based super alloy.

14. The guide vane as claimed in claim 1,
wherein the platform on the side thereof that faces away from the vane blade comprises two directly adjacent seal lips which extend so as to be at least substantially mutually parallel and spaced apart.

15. The guide vane as claimed in claim 1,
wherein the plurality of cooling ducts are at least substantially mutually parallel.

* * * * *